(12) United States Patent
Nakagawa et al.

(10) Patent No.: US 7,079,294 B1
(45) Date of Patent: Jul. 18, 2006

(54) IMAGE READING APPARATUS AND IMAGE FORMING APPARATUS

(75) Inventors: Daigo Nakagawa, Toride (JP); Takashi Awai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1163 days.

(21) Appl. No.: 09/695,931

(22) Filed: Oct. 26, 2000

(30) Foreign Application Priority Data

Oct. 29, 1999 (JP) .............................. 11-308387
Sep. 29, 2000 (JP) ........................ 2000-298113

(51) Int. Cl.
- *H04N 1/04* (2006.01)
- *H04N 1/024* (2006.01)
- *G06K 9/20* (2006.01)
- *B65H 5/00* (2006.01)

(52) U.S. Cl. ...................... 358/496; 358/473; 358/498; 382/312; 271/264

(58) Field of Classification Search ................ 358/496, 358/473, 498; 382/312, 498; 271/264
See application file for complete search history.

(56) References Cited

U.S. PATENT DOCUMENTS

| | | | | |
|---|---|---|---|---|
| 5,359,435 A | * | 10/1994 | Hayashi et al. | 358/498 |
| 5,844,698 A | * | 12/1998 | Fu et al. | 358/488 |
| 6,128,105 A | * | 10/2000 | Ishikawa et al. | 358/438 |
| 6,178,274 B1 | * | 1/2001 | Youda et al. | 382/312 |
| 6,208,828 B1 | | 3/2001 | Awai et al. | 399/361 |
| 6,552,828 B1 | * | 4/2003 | Gatto | 358/496 |

* cited by examiner

*Primary Examiner*—Mark Wallerson
*Assistant Examiner*—Houshang Safaipour
(74) *Attorney, Agent, or Firm*—Fitzpatrick, Cella, Harper & Scinto

(57) ABSTRACT

An image reading apparatus, wherein it comprises a conveying unit for conveying an original, a reading unit for optically reading the information recorded in the conveyed original at a predetermined reading location, an original pressing unit for pressing the original to the reading unit, and a color reference member used as a color reference a the time when the information is read by the reading unit, and wherein the color reference member is arranged between the reading unit and the original pressing unit and the pressing location of the original to the reading means by the original pressing unit is disposed at a location within the original conveying region and other than the reading location.

14 Claims, 15 Drawing Sheets

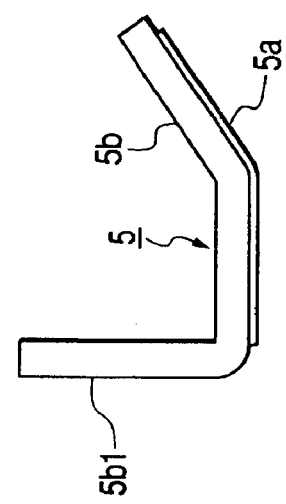
FIG. 2B
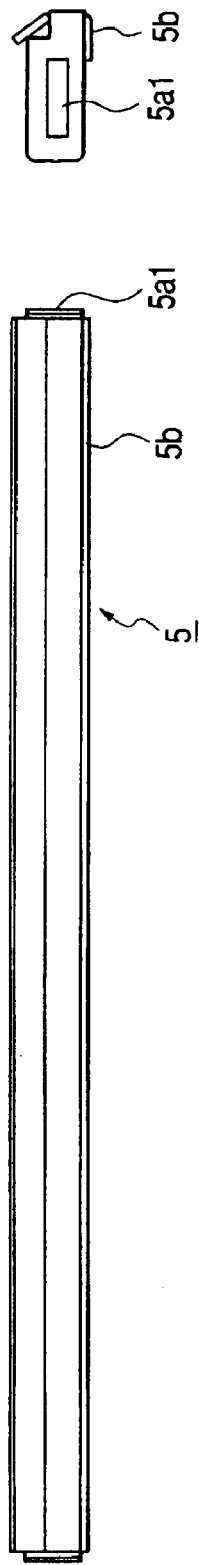
FIG. 2A
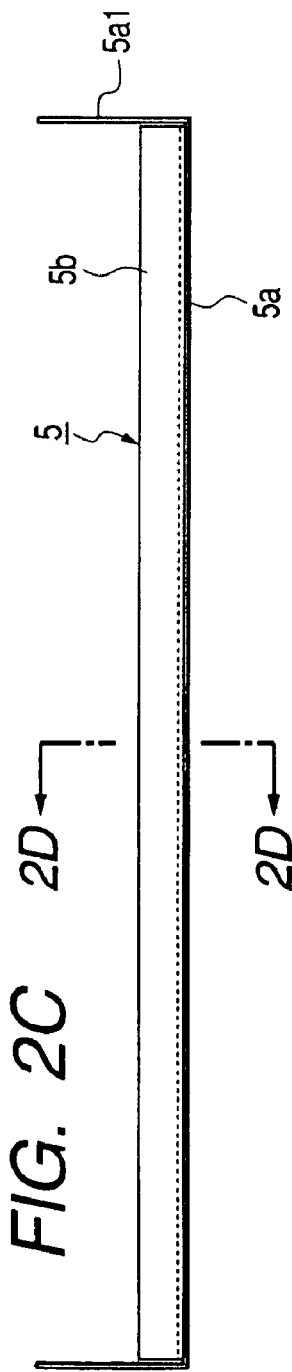
FIG. 2C
FIG. 2D

IMAGE READING APPARATUS AND IMAGE FORMING APPARATUS

BACKGROUND OF THE INVENTION

1. Field of the Invention

The present invention relates to an image reading apparatus for reading image information of an original and is applied to an image forming apparatus, for example, such as an facsimile machine and the like.

2. Related Background Art

Heretofore in the past, this kind of the image reading apparatus has been available such as shown in FIG. 15. As shown in FIG. 15, an original pressing means 52 for pressing the original to a contact image sensor 51 as an image reading means was configured in such manner that it is contacted to the reading surface of the contact image sensor 51.

The original pressing means 52 is configured by a white sheet 52a as a reading reference (a color reference) and a white sheet metal 52b. The white sheet 52a is fixed with its upper portion screwed with a vis. The white sheet metal 52b is fixed by hanging on an upper original guide above the inside of the apparatus at an original conveying direction downstream side.

Also, as shown enlarged in FIG. 16, an emboss 52c is disposed outside the original conveying direction area of a longitudinal both ends portion of the original pressing means 52 so that the original pressing means 52 is not adhered (or cohered) to the reading surface of the contact image sensor 51.

Note that the original pressing means 52 at the time when the above described emboss 52c is disposed is deprived of a function to press the original to the reading surface and given a function to guide the original at a reading location so as not to behave violently.

And, for example, at the time of the pre-scanning prior to the commencement of the image reading operation, the operation for detecting a reflective light volume from the reading reference 52a and for deciding a white level (a color reference) to determine the output level (the contrast level) of the information read by the image sensor is activated.

However, in case of the above described prior art, the white sheet 52a strongly contacts the reading surface of the reading location of the contact image sensor 51 and tends to adhere (or cohere) thereto owing to the fixing condition of the original pressing means 52 to the contact image sensor 51, accuracy of each component thereof and the like. Then, the reflective state of light at the adhesive (or cohesive) surface is changed and the output of brightness which is the reading reference of the image is lowered, thereby causing the problem where the reading image becomes whitish. When this adhesion (or cohesion) arises at a longitudinal part, a malfunction occurs in which the portion where the output is lowered becomes white line (or streak) if seen from the whole reading image.

For this reason, in order to prevent the adhesion (or cohesion) of the original pressing means 52, it was necessary to take measures such as the disposition of an emboss of high accuracy and the control of warping of the white metal sheet and the like.

SUMMARY OF THE INVENTION

The present invention is made to solve the above described problem of the prior art and its object is to prevent the adhesion between the color reference member and the reading surface with certainty and in a simple configuration and to provide an image reading apparatus and an image forming apparatus which can obtain a highly accurate reading image.

In order to achieve the above described object, the image reading apparatus of the present invention comprises:

conveying means for conveying an original;

reading means for optically reading the information recorded in the conveyed original at a predetermined reading location;

original pressing means for pressing the original to the above described reading means;

a color reference member used as a color reference at the time when the above described information is read by the above described reading means; and in which the above described color reference member is disposed between the above described reading means and the above described original pressing means, and the pressing location of the original to the above described reading means by the above described original pressing means is disposed at a location within the original conveying area and other than the above described reading location.

Consequently, since with a simple and low-cost configuration without increasing the number of parts, the adhesion (or cohesion) between the color reference member and the reading surface by the original pressing member is prevented, and a definite color reference can always be obtained, the image reading apparatus does not develop any image defect in the reading image, thereby obtaining a highly accurate reading image.

BRIEF DESCRIPTION OF THE DRAWINGS

FIGS. 2A, 2B, 2C and 2D are three planes showing the original pressing means relative to the embodiments of the present invention;

DETAILED DESCRIPTION OF THE PREFERRED EMBODIMENT

Hereinafter, the preferred embodiments of the present invention will be described in detail with reference to the accompanied drawings. It is to be understood, however, that the spirit and scope of the present invention are not limited to the size, material, shape, relative arrangement of the components and the like described in the embodiments unless particularly described otherwise.

With reference to FIG. 1 to FIG. 7, an image reading apparatus and an image forming apparatus relative to the embodiments will be described. Note that, as for the order of descriptions, in the first place, the rough configuration of a facsimile machine as the image forming apparatus will be described and, then, the configuration and the operations of the image reading apparatus will be described.

First Embodiment

First, with reference to FIG. 6, FIG. 7, the configuration of the facsimile machine as one example of the image forming apparatus will be described.

Figure 1:
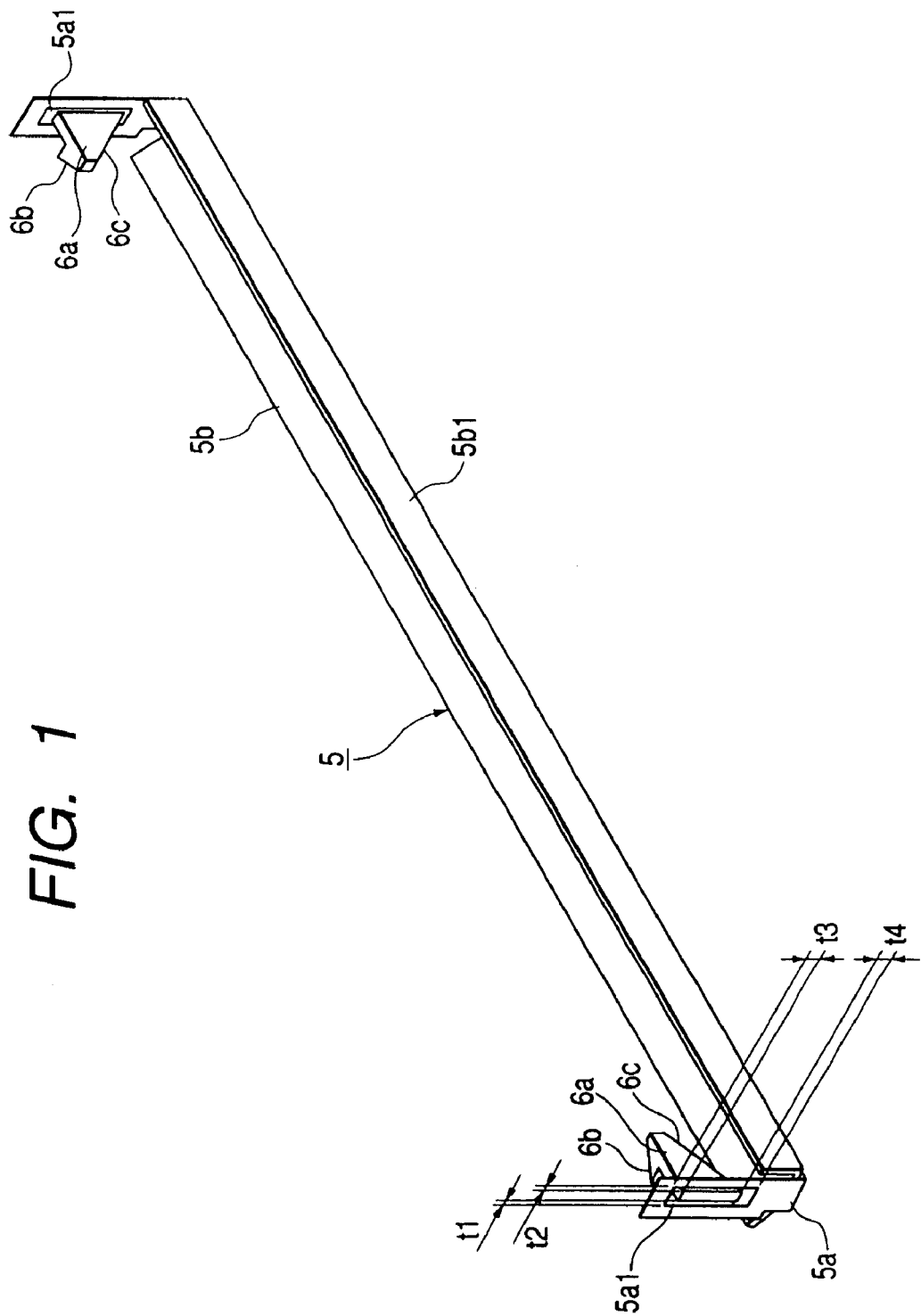
FIG. 1 is a perspective view showing an original pressing means relative to the embodiments of the present invention.
Figure 6:
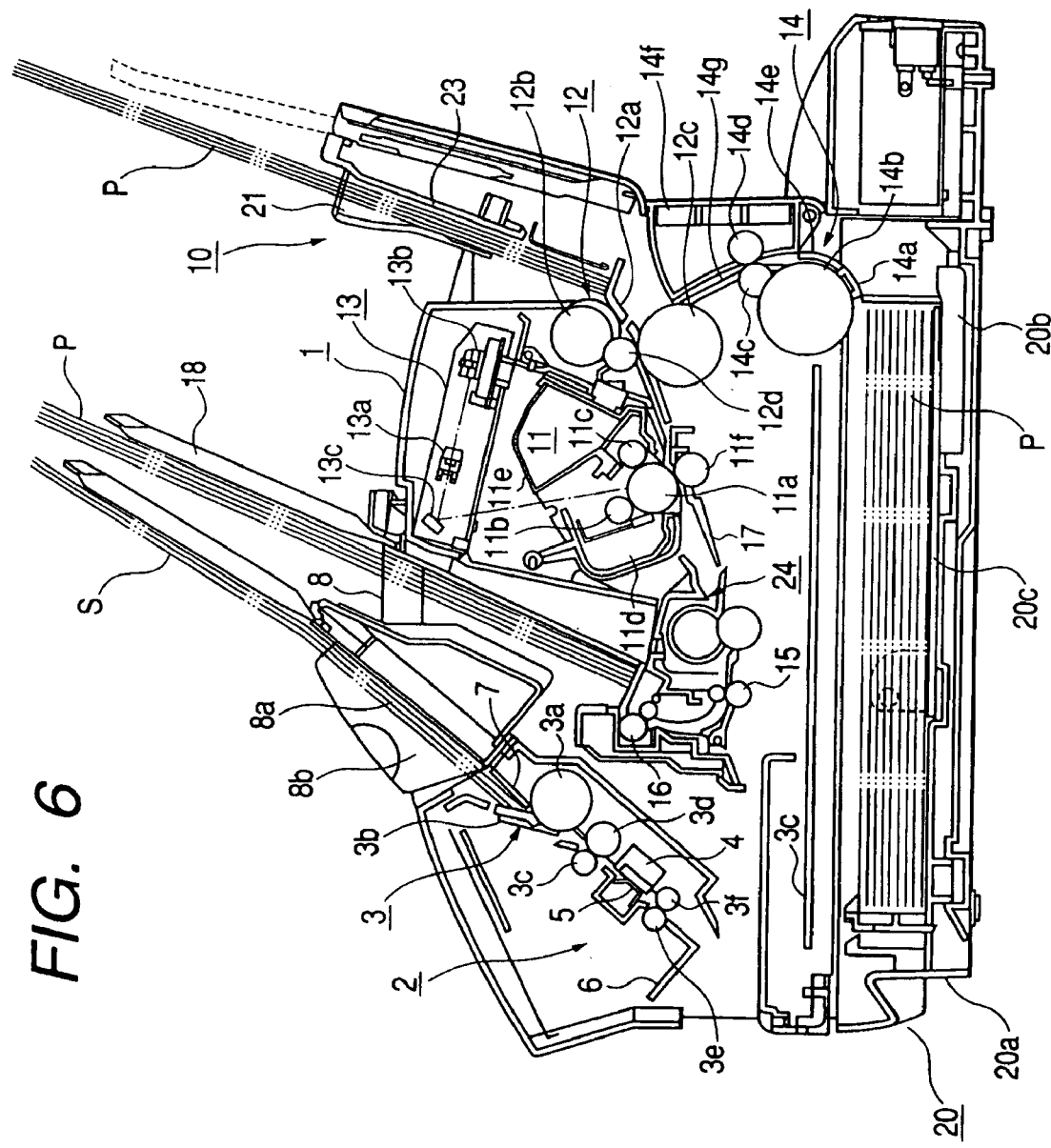
FIG. 6 is a rough cross sectional view showing a facsimile machine relative to the embodiments of the present invention.
Figure 7:
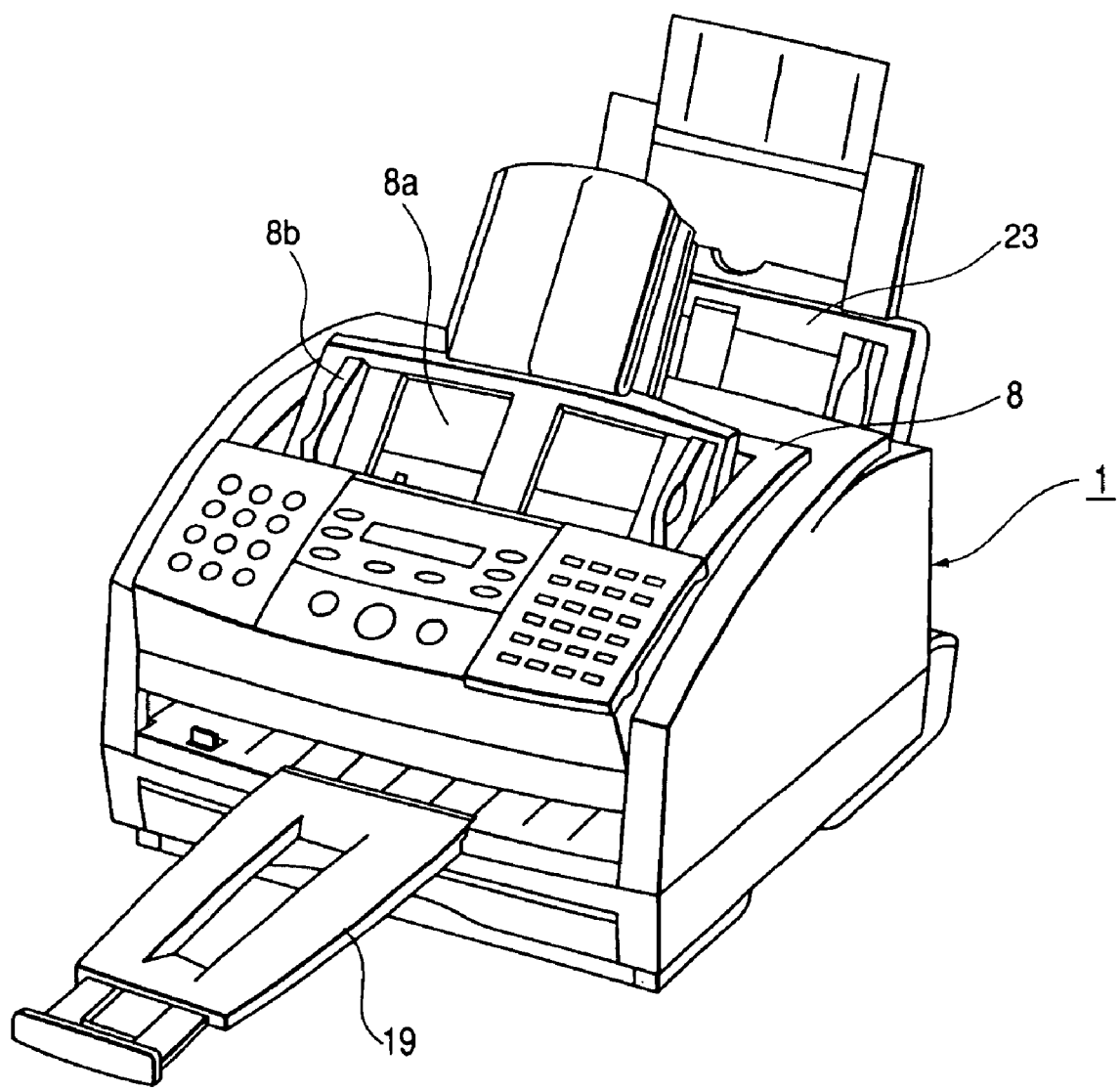
FIG. 7 is a perspective view showing the facsimile machine relative to the embodiments of the present invention.

In FIG. 6 and FIG. 7, 1 is an apparatus body and configured by an image reading portion 2 which is the image reading apparatus for reading the image of an original S as a reading object and an image forming portion 10 forming an image on a recording paper P as the sheet of a recording object.

The image reading portion 2 comprises: a top cover 8 having an original mounting stand 8a capable of mounting a plurality of originals S; a contact image sensor 4 as an image reading means for reading the image information of the original S; and an original pressing means 5 for pressing the original S to the contact image sensor 4.

Also, the image reading portion 2 feeds the original S mounted on the original mounting stand 8a one sheet each in order, and has an original conveying portion 3 for conveying the original via the contact image sensor 4 and an upper original guide 6 as well as a lower original guide 7 forming the conveying path of the original S.

An top cover 8 having the original mounting stand 8a is mounted on the apparatus body 1 in such manner that it can open and close so that the replacement of the cartridge to be described later and the disposal of a paper jam can be easily executed.

Also, a slider 8b slidable in the width direction orthogonal to the conveying direction of the original S is disposed on the original mounting stand 8a in such manner that both ends in the width of the original S mounted on the original mounting stand 8a can be made identical by the slider 8b.

Figure 3:
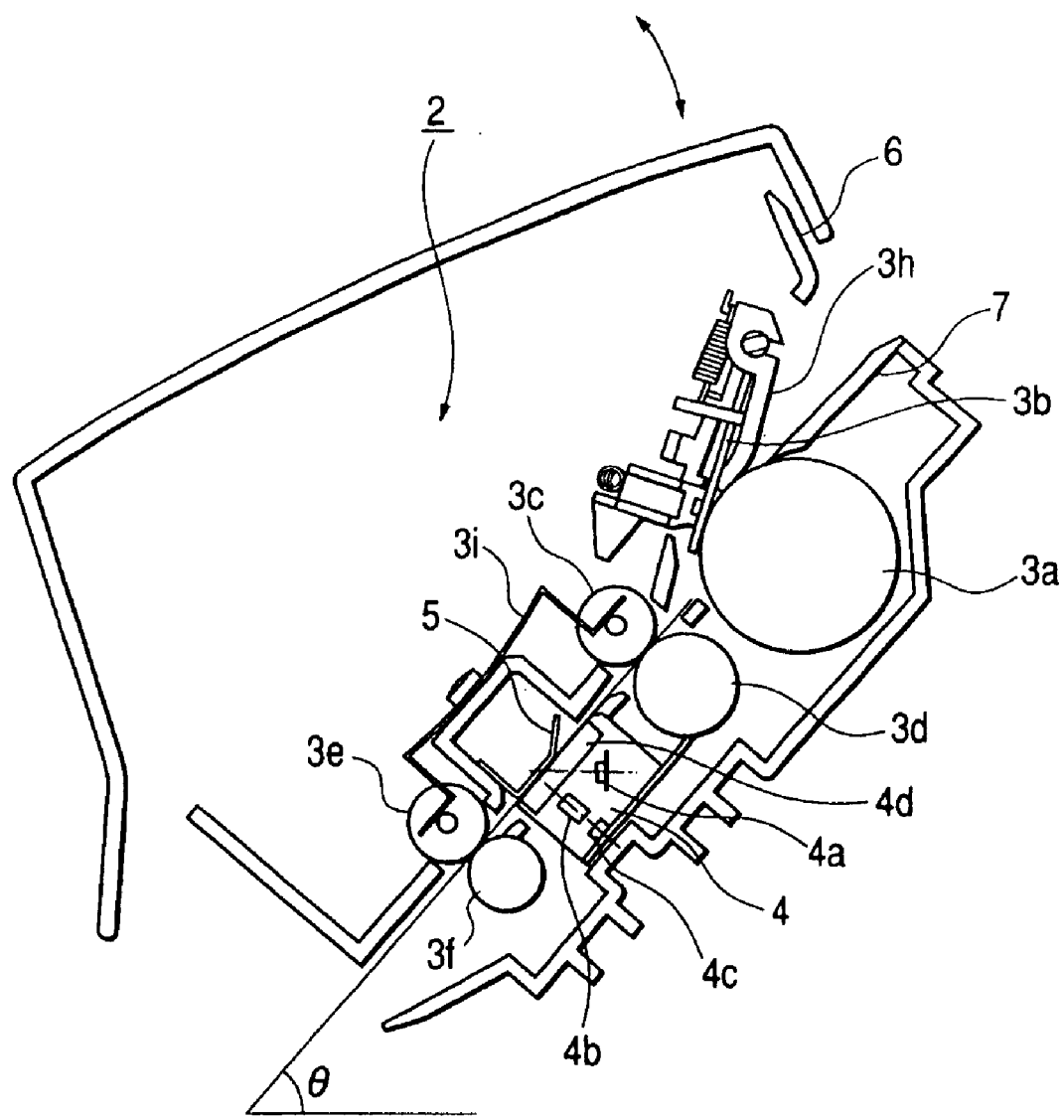
FIG. 3 is a rough cross sectional view of an image reading portion relative to the embodiments of the present invention.

Also, as shown in FIG. 3, the contact image sensor 4 is such that, for example, light from a LED array 4a as a light source passes through a reading window portion 4d having light permeability and irradiates the image information surface of the original S, while the reflective light reflected from the image information surface is image-formed on a sensor element 4c by a selfoc lens 4b (a registered trade mark) after passing the reading window portion 4d again and reads the image information. For the reading window portion 4d, though a material such as glass and the like is generally used, its use is not limited to this if there is available any material having light permeability.

Note that the detailed description of the image reading portion 2 as the image reading apparatus applying the present invention will follow later.

The image forming portion 10 comprises: a recording paper mounting portion 23 for mounting a recording paper P; a recording paper feeding portion 12 for feeding the recording paper P one sheet each in order from the recording paper mounting portion 23; an image forming means 11 for forming an image on the fed recording paper P; and a laser scanner 13 for irradiating a laser light as the image information on the image forming means 11.

Also, the image forming portion 10 has: a shared discharge tray 19 for mountably holding the recording paper P discharged after the completion of image forming or the original S discharged after the completion of reading; a recording paper discharge stand 18 for mountably holding the recording paper P discharged U-turn-wise after the completion of image forming; and a conveying guide 17 for guidably holding the recording paper P to be conveyed.

In the recording paper feeding portion 12, when the feeding commences, the recording paper P compressed to a separating roller 12b is separated one sheet each by the separating roller 12b and a separating pad 12a compressed thereto and, thereafter, conveyed between a photosensitive drum 11a of the image forming means 11 and a transferring means 11f with a good timing so that the top end of the image (the toner image) formed on a photosensitive drum 11a of the image forming means 11 is made identical with the top end of the recording paper P by a conveying roller 12c and a conveying roller 12d compressed thereto which rotates slavely.

Note that the recording paper mounting portion 23 is capable of mounting a plurality of recording papers P and the number of recording papers possible to mount for setting is counted approximately as 100 sheets.

Moreover, the size of the recording papers possible to mount for setting is considered to be three kinds of A4 size, a letter size and a regal size. However, the present invention is not limited to the above in the number and the size of the recording papers possible to mount for setting, but it can be suitably arranged as occasion demands.

A cassette portion 20 of the recording papers P is arranged at the base of the apparatus body 1. The recording papers P mounted on the cassette 20a are compressed to a separating roller 14b by the rotation upward of an intermediate plate 20c by a compressing member 20b, and are separated one sheet each by a separating pad 14a (a friction piece separating method) and conveyed along a separating pad guide 14e and further reversed by a convey roller 14c, a cover side U-turn guide 14f arranged on the rear cover and a apparatus side U-turn guide 14g arranged on the apparatus body side, and finally reach a conveying roller 12c.

Thereafter, the operations are the same as the above described image forming portion 10. The selection of the recording paper mounting portion 23 and the cassette sheet feeding portion 20 can be made at random.

In the image forming means 11, first, on the basis of an image signal, the laser beam which is an image signal is emitted from the laser beam generator of a laser scanner 13. This laser beam is irradiated at the photosensitive drum 11a of the image forming means 11 by a polygon mirror 13b, a lens 13a and a folded mirror 13c, and an image is formed on the surface of the photosensitive drum 11a.

In the image forming means 11, the photosensitive drum 11a is assembled into the inside of a frame body together with a charging means 11b as a processing means acting on the drum, a developing means 11c and a cleaning means 11d so that a processing cartridge 11e is configured. This processing cartridge 11e is configured in such manner that it is detachable from the apparatus body 1.

Consequently, at the above described image forming time, the laser beam from the laser scanner 13 is irradiated on the surface of the photosensitive drum 11a charged uniformly by the charging means 11b so that a latent image is formed and the latent image is developed into an actual image (a toner image) by toner supplied from a developing means 11c.

Figure 15:
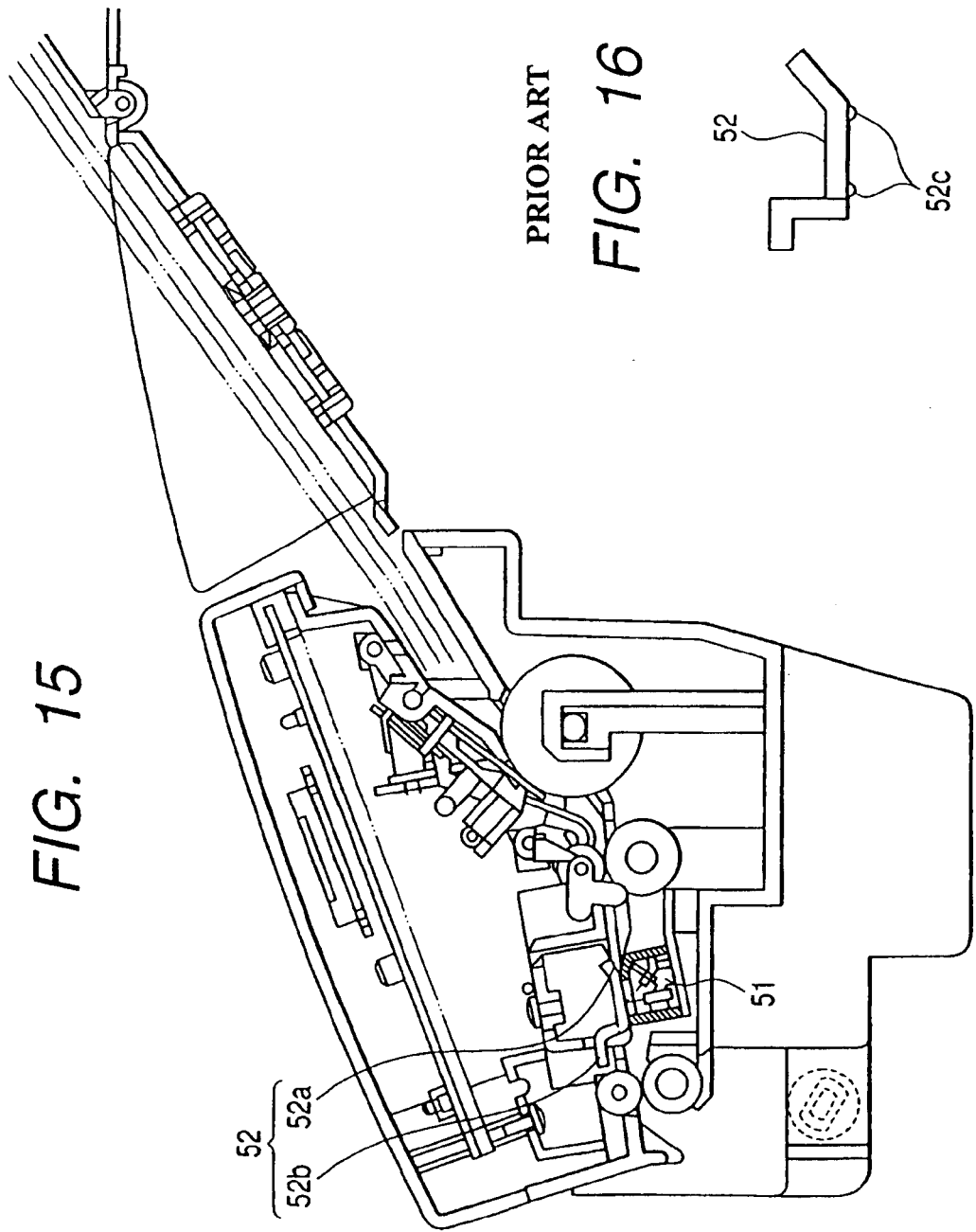
FIG. 15 is a rough cross sectional view showing the image reading apparatus of the prior art.
Figure 16:
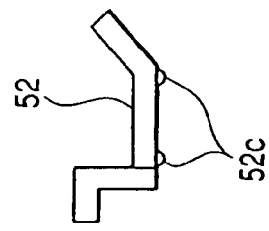
FIG. 16 is a side view showing the original pressing means of the prior art.

Also, in the image forming means 11, the transferring means 11f for transferring the toner image formed on the surface of the photosensitive drum onto the recording paper P is arranged around the peripheral region of the photosensitive drum 11a, and moreover, a fixing means 24 for fixing the transferred toner image onto the recording paper P is arranged in the recording paper conveying path at the side of the photosensitive drum 11a. Note that, in FIGS. 6, 15, 16 are a pair of discharging rollers.

Consequently, the configuration is such that after the toner image formed on the surface of the photosensitive drum 11a by the transferring means 11f is transferred, the recording paper P fed timely to the image forming means 11 from the recording paper mounting portion 23 is conveyed along a conveying guide 17 with the toner image fixed by the fixing means 24 and discharged to the shared discharging tray 19 from the pair of discharging rollers 15 or to a recording paper discharging stand 18 from the pair of discharging rollers 16 via an U-turn path.

Note that, in case where a paper jam is developed while forming an image, the recording paper P remained inside the apparatus can be easily taken out by opening a closing bar of the top cover 8 having the original mounting stand 8a.

Next, the structure and operations of the image reading portion 2 will be described with reference to the accompanied drawings FIG. 1 to FIG. 5.

Figure 4:
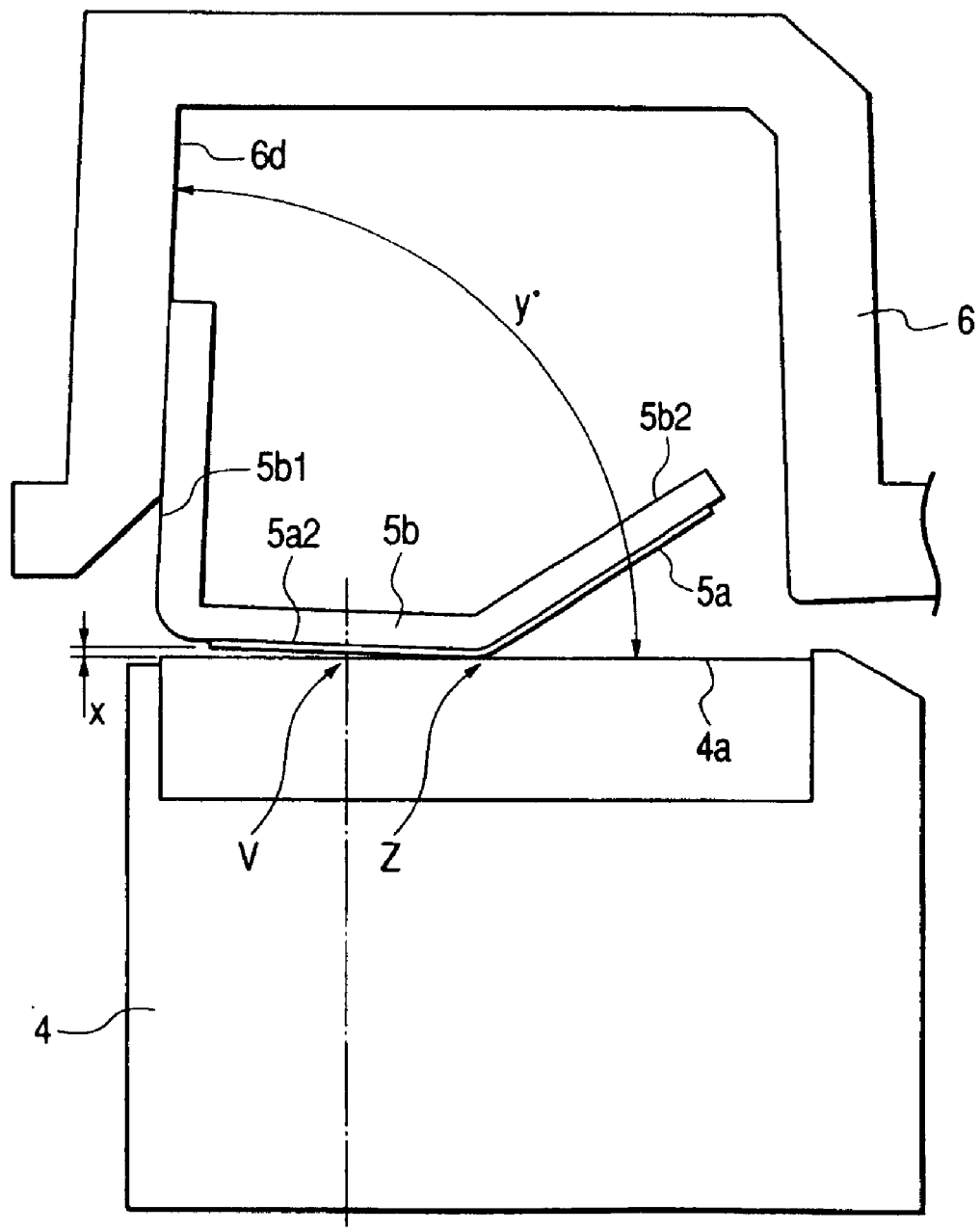
FIG. 4 is an enlarged view of a contact image sensor relative to the embodiments of the present invention.
Figure 5:
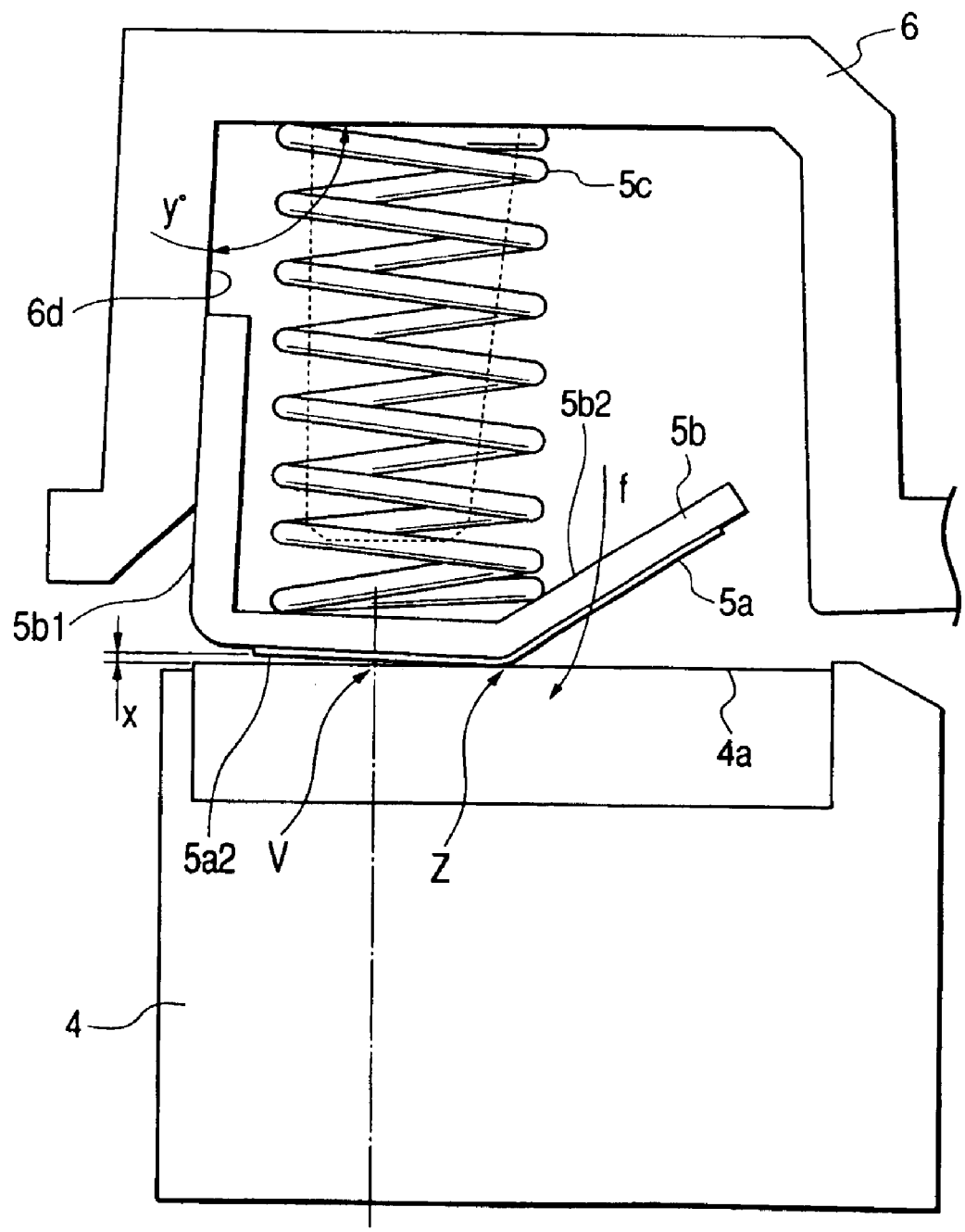
FIG. 5 is a enlarged view showing the original pressing means and the contact image sensor relative to a second embodiment of the present Invention.

FIG. 1 is a principal perspective view showing a state of coupling between the original pressing means 5 and the upper original guide 6. FIGS. 2A to 2D are block diagrams of the original pressing means 5, and FIG. 2A is an upper view, FIG. 2B a side view, FIG. 2C a front view, and FIG. 2D a enlarged view cut along 2D—2D line of FIG. 2C. FIG. 3 is a type cross-sectional view of an image reading portion 2. FIG. 4, FIG. 5 are a enlarged view of show image reading portion showing the enlarged original pressing means 5 and a contact image sensor 4.

First, with reference to FIG. 3, the structure of the image reading portion 2 will be described along the flow of the original S. As shown in FIG. 3, in the image reading portion 2, when the original S is mounted on the original mounting stand 8a (refer to FIG. 6), the top end of the original S is interposed between a separating roller 3a and a pre-compressing arm 3h compressed thereto.

After the original S is set in this manner and when the conveying of the original S commences, the original S is conveyed to the friction piece 3b by the separating roller 3a and the pre-compressing arm 3h compressed thereto.

And the original S is separated one sheet each and conveyed to the friction piece 3b by the separating roller 3a and the friction piece 3b compressed thereto.

The original S thus separated into one sheet each is conveyed to the contact image sensor 4 by a sheet feeding roller 3c pressed by a pressing spring 3i and a compressing sheet feeding roller 3d and the like, and while being pressed by the original pressing means 5 mentioned later and contacted by the contact image sensor 4, the original S is successively line-feeded so that the image information thereof is read out.

Thereafter, the original S is discharged to a shared discharging tray 19 (refer to FIG. 7) by a sheet discharging roller 3e pressed by the pressing spring 3i and a compressing sheet discharging roller 3f.

During this time, the original S is guided by the upper original guide 6 and a lower original guide 7 and conveyed to the original conveying path.

Note that, on the upper original guide 6 side, there are disposed the pre-compressing arm 3h, the friction piece 3b, the sheet feeding roller 3c, the sheet discharging roller 3e, the pressing spring 3i, the original compressing means 5 and the like, while on the side of the lower original guide 7 side, there are disposed the separating roller 3e, the sheet feeding roller 3d, the sheet discharging roller 3f, the contact image sensor 4 and the like.

And the upper original guide 6 side is closable in the arrow mark direction as shown in FIG. 3 against the lower original guide 7 side. Consequently, when a paper jam and the like are developed, the original conveying path is released by opening the upper original guide 6 side and the disposal of the paper jam can be easily executed.

Next, the original pressing means 5 will be described in detail. In FIG. 1 and FIG. 2, FIG. 3, the original pressing means 5 is for pressing the original S to the contact image sensor 4.

This original pressing means 5 is configured by the white sheet 5a which is a color reference member and an original pressing member 5b for pressing the original S to the reading surface of the contact image sensor 4 via the white sheet 5a.

As shown in FIG. 2, the white sheet 5a and the original pressing member 5b are connected by a double-tape. Note that the connecting method for the white sheet 5a and the original pressing member 5b is not limited to this, but both of them may be connected by adhesive other than the double-tape (such as acrylic, rubber-based adhesive) or binding material.

Also, as shown in FIG. 1 and FIG. 2, the white sheet 5a has a mounting hole 5a1 which becomes a mounting portion to the upper guide 6 on its longitudinal both ends (both ends in width direction orthogonal to the original conveying direction). In the present embodiment, the white sheet 5a has the length in which the portion having the mounting hole 5a1 is added to the longitudinal length of the original pressing member 5b, and the portion having the mounting hole 5a1 is bent in the both ends portion of the original pressing member.

This white sheet 5a is deformable and, concretely for example, formed by material such as polyester film, synthetic paper (the so-called YUPO), polycarbonate sheet, vinyl chloride sheet and the like.

And, on the upper guide 6, a triangle rib 6a as a hanging portion for hangingly supporting the mounting hole 5a1 of the while sheet 5a is disposed. In FIG. 1, the upper original guide 6 is omitted and the triangle rib 6a alone is shown.

Moreover, on the triangle rib 6a, a slip-out stopping portion 6b for stopping the slip-out of the mounting hole 5a1 of the white sheet 5a and a slope 6c for guiding the mounting hole 5a1 of the white sheet 5a when the original pressing means 5 is mounted on the upper original guide 6.

Here, clearances t1 to t4 formed when the triangle rib 6a is hangingly supported by the mounting hole 5a1 are the clearances disposed so that the original pressing means 5 can move to predetermined locations.

Consequently, the mounting of the original pressing means 5 thus connected as described above to the upper original guide 6 can be easily executed by pushing the mounting hole 5a1 of the white sheet 5a along the slope 6c of the triangle rib 6a and by opening outside the longitudinal direction the mounting hole 5a1 of the white sheet 5a slackened inside the longitudinal direction by the pushing and then by inserting the mounting hole 5a1 into the triangle rib 6a of the upper original guide 6.

As described above, since the original pressing member 5b is connected to the white sheet 5a by the double-tape, the mounting can be executed just simply by pushing the deformable white sheet 5a connected to the original pressing member 5b into the predetermined location of the upper original guide 6 and by inserting the mounting hole 5a1 into the triangle rib 6a of the upper original guide 6.

The method for preventing the adhesion (or cohesion) of the image reading portion to the white sheet 5a in the present invention is shown in FIG. 4. The original pressing member 5b has a side 5b1 in the bent portion bent up approximately at an angle of 90° in the original conveying direction downstream side, and the upper original guide 6 has a regulating surface 6d so as to make an acute angle y° with a reading surface 4a. In the sample of FIG. 4, the value of y° is 88°.

Since the reading surface 4a has an angle θ and inclined as shown in FIG. 3, the original pressing member 5b in FIG. 4 is configured in such manner that the side 5b1 follows a regulating surface 6d of the upper original guide 6 owing to a gravity, and the original conveying direction downstream side end portion of a pressing surface 5a2 for pressing the original S is fixed in the state separated from the reading surface 4a and makes a clearance x. This clearance x can be adjusted by the value of y.

According to this configuration, a Z portion alone which is the original convey direction upstream side end portion of the pressing surface 5a2 becomes the contact portion of the white sheet 5a and the reading surface 4a, and in a reading location V portion, a minute clearance can be disposed. For the value of this minute clearance, it is desirable to be set within an image reading possible range of the contact image sensor (for example, within the depth of focus of a reading optical system).

Thus, the reduction in brightness of the pre-scanning time by the adhesion (or cohesion) of the white sheet 5a to the reading surface 4a can be prevented and a constant output can be always obtained.

Second Embodiment

Also, as shown in FIG. 5, by disposing the original pressing compression spring 5c as a compressing means at the rear side of the original pressing means 5, the pressing of the original is increased. At this time, by having the original pressing compression spring 5c run on the upstream side slope 5b2 of the original guide portion disposed in the original conveying direction upstream side of the pressing surface 5a2 of the original pressing member 5b, the force in the arrow mark direction is activated even if pressed by the original pressing compression spring 5c and the above described clearance can be definitely secured.

Third Embodiment

Figure 8:
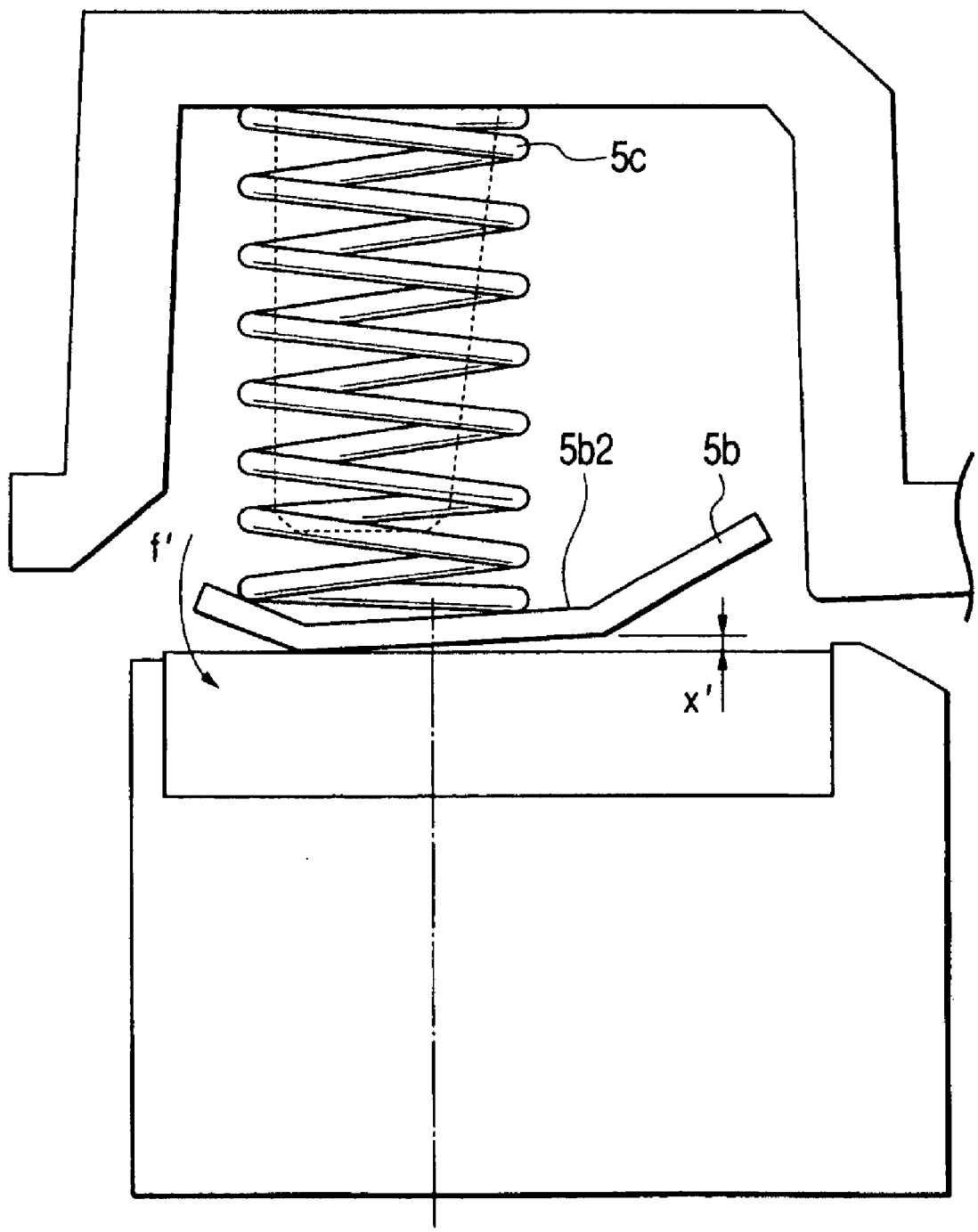
FIG. 8 is a enlarged view showing the original pressing means and the contact image sensor of a third embodiment of the present invention.

FIG. 8 is a drawing showing the third embodiment of the present invention. In the present embodiment, the upstream side in the original conveying direction of the original pressing member 5b is floated and, even in this embodiment, the adhesion (or cohesion) in the reading portion can be prevented.

In the same drawing, the original pressing compression spring 5c is arranged against the original pressing member 5b as shown in the drawing, and by activating the force shown as f' in the drawing, the original conveying direction upstream side of the original pressing member 5b is floated, thereby forming a clearance X.

By the formation of this clearance, the adhesion (or coheshion) in the image reading portion can be prevented.

Note that, in the present embodiment, the configuration is shown in which the original pressing compression spring is used. However, for the method for floating the upstream side, other configuration may be used in which, for example, the dead load alone of the original pressing member is employed similar to the first embodiment. Of course, there is no limit imposed on these methods.

In the above described embodiment, three pieces of the original pressing compression spring 5c are used longitudinally. Needless to say, however, the present invention does not limit the number of pieces. Although, in the above described embodiment, one sample of the original pressing means 5 is shown, it is needless to mention that the present invention is not limited to this, and the original pressing means 5 using metal for the original pressing member 5b can be also used.

Note that the original pressing means 5 may be coated with white paint with the coated surface thereof used as a color reference. Moreover, the original pressing means itself may be configured by white material.

Fourth Embodiment

An image reading apparatus and an image forming apparatus relative to the fourth embodiment will be described in detail with reference to the accompanied drawings. Note that, as for the order of descriptions, in the first place, a rough configuration of a facsimile machine will be described, and then, the configuration of the image reading apparatus applying the present invention and the operations thereof will be described.

Figure 12:
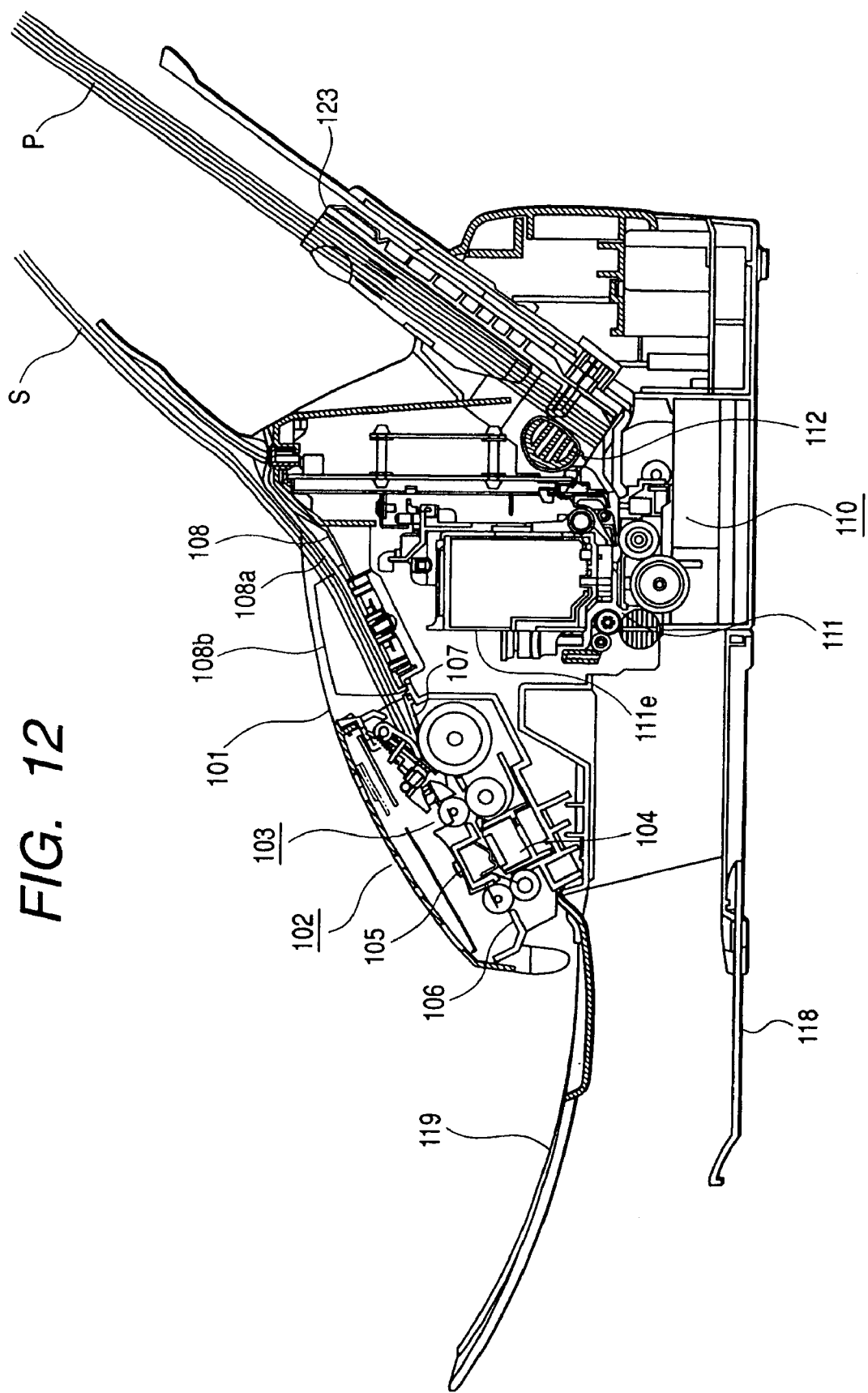
FIG. 12 is a normal cross sectional view of the facsimile relative to the fourth embodiment of the present invention.

First, a rough configuration example of a different facsimile machine as the image forming apparatus will be described with reference to FIG. 12. In FIG. 12, 101 is an apparatus body and configured by an image reading portion 102 for reading the image of an original S as a reading object and an image recording portion 110 for recording the image on a recording paper P as a recording object.

The above described reading portion 102 has: a top cover 108 having an original mounting stand 108a capable of mounting a plurality of originals S; an contact image sensor 104 as a reading means for reading image information of the original S; an original pressing means 105 for pressing the original S to the contact image sensor 104; an original conveying portion 103 for conveying one sheet each of the original S mounted on the above described original mounting stand 108a via the above contact image sensor 104; and an upper original guide 106 and a lower original guide 107 forming a conveying path of the original S.

The top cover 108 having the above described original mounting stand 108a is mounted on the apparatus body 101 with capability of closing and opening so that the replacement of an ink recording cartridge 111e and the disposal of a paper jam can be easily executed. Also, on the above described original mounting stand 108a, a slider 108b is disposed which is capable of sliding in the width direction orthogonal to the conveying direction of the original S so that both ends of the original S mounted on the original mounting stand can be made identical by the slider 108b.

Also, the contact image sensor 104 as the reading means irradiates light on the image information from a LED array as a light source and reads the image information by image-focusing the reflective light reflected on the image information surface on sensor elements by a selfoc lens (a registered trademark).

The above described image recording portion 110 has: a mounting portion 123 for mounting a recorded paper P as a recording object; a recording paper feeding portion 112 for feeding the recording paper P from the recording paper mounting portion 123 one sheet each in order; an image forming portion 111 for record-forming the image on the fed recording paper P; and a recording paper discharging tray 118 for mountably-holding the recording paper P discharged after recording.

Figure 11:
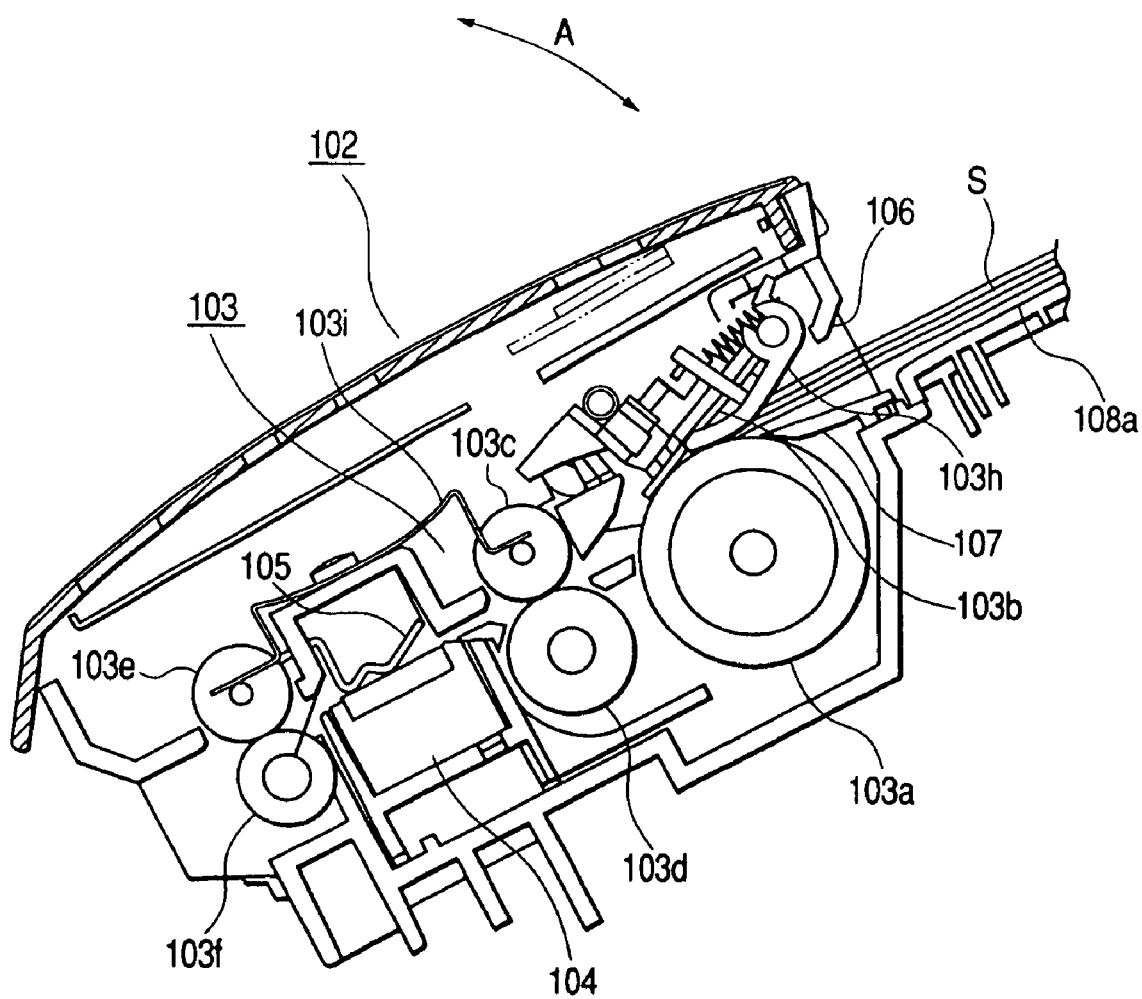
FIG. 11 is a normal cross sectional view of the image reading apparatus relative to the fourth embodiment of the present invention.

Next, referring to FIG. 11, the configuration of the image reading portion 102 using the original pressing means will be described along with the flow of the original. FIG. 11 is a normal front view of the image reading portion. In the image reading portion 102, when the original S is mounted on the original mounting stand 108a, the tip of the original S is interposed between a separating roller 103a and a pre-compressing arm 103h compressed thereto. In this manner, after the original is set and when the conveying of the original S starts, the above described original S is conveyed to a friction piece 103b by the separating roller 103a and the pre-compressing arm 103h compressed thereto, and separated one sheet each by the separating roller 103a and the friction piece 103b compressed thereto for further feeding. The original thus separated one sheet each is conveyed to the contact image sensor 104 by a sheet feeding roller 103c pressed by a pressing spring 103i and a compressed sheet feeding roller 103d and the like and, while being pressed to the contact image sensor 104 by the original pressing means 105 to be described later, the original S is successively linefeeded so that the image information thereof is read out. Thereafter, the original S is discharged to an original sheet discharging tray 119 (refer to FIG. 12) by a sheet discharging roller 103f compressed to a sheet discharging roller 103e pressed by a pressing spring 103i. During this time, the original S is guided by an upper original guide 106 and an lower original guide 7.

Note that, on the upper original guide 106 side, there are disposed the pre-compressing arm 103h, the friction piece 103b, the sheet feeding roller 103c, the sheet discharging roller 103e, the pressing spring 103i, the original pressing means 105 and the like and, on the lower original guide 107 side, there are disposed the separating roller 103e, the sheet feeding roller 103d, the sheet discharging roller 103f, the contact image sensor 104 and the like. The upper original guide 106 side is capable of closing and opening against the lower original guide 107 side in the arrow mark direction A. Consequently, when a paper jam is developed, the original conveying path is released by opening the upper original guide 106, thereby the disposal of the paper jam can be easily executed.

Figure 9:
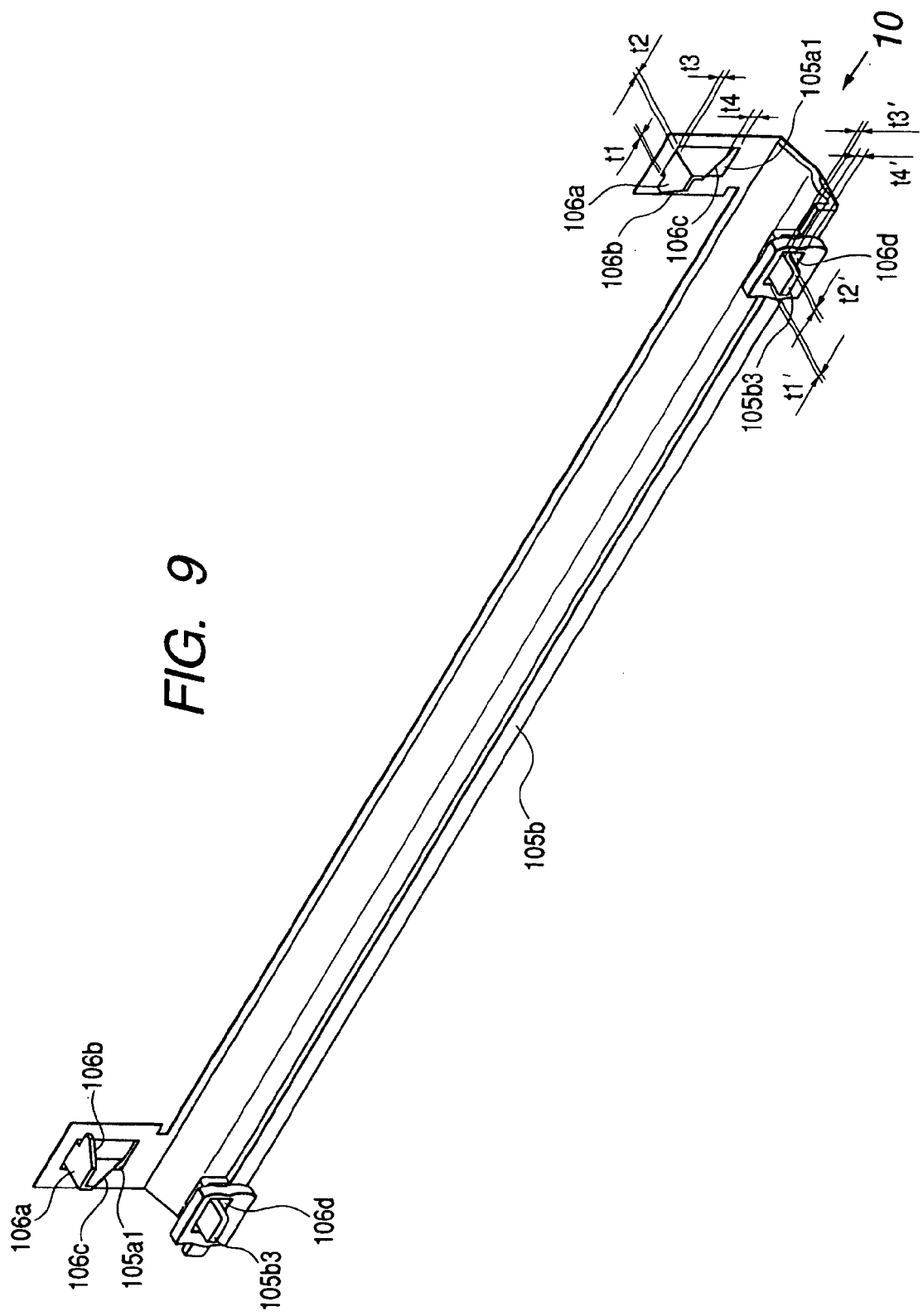
FIG. 9 is a perspective view showing the original pressing means of a fourth embodiment of the present invention.
Figure 10:
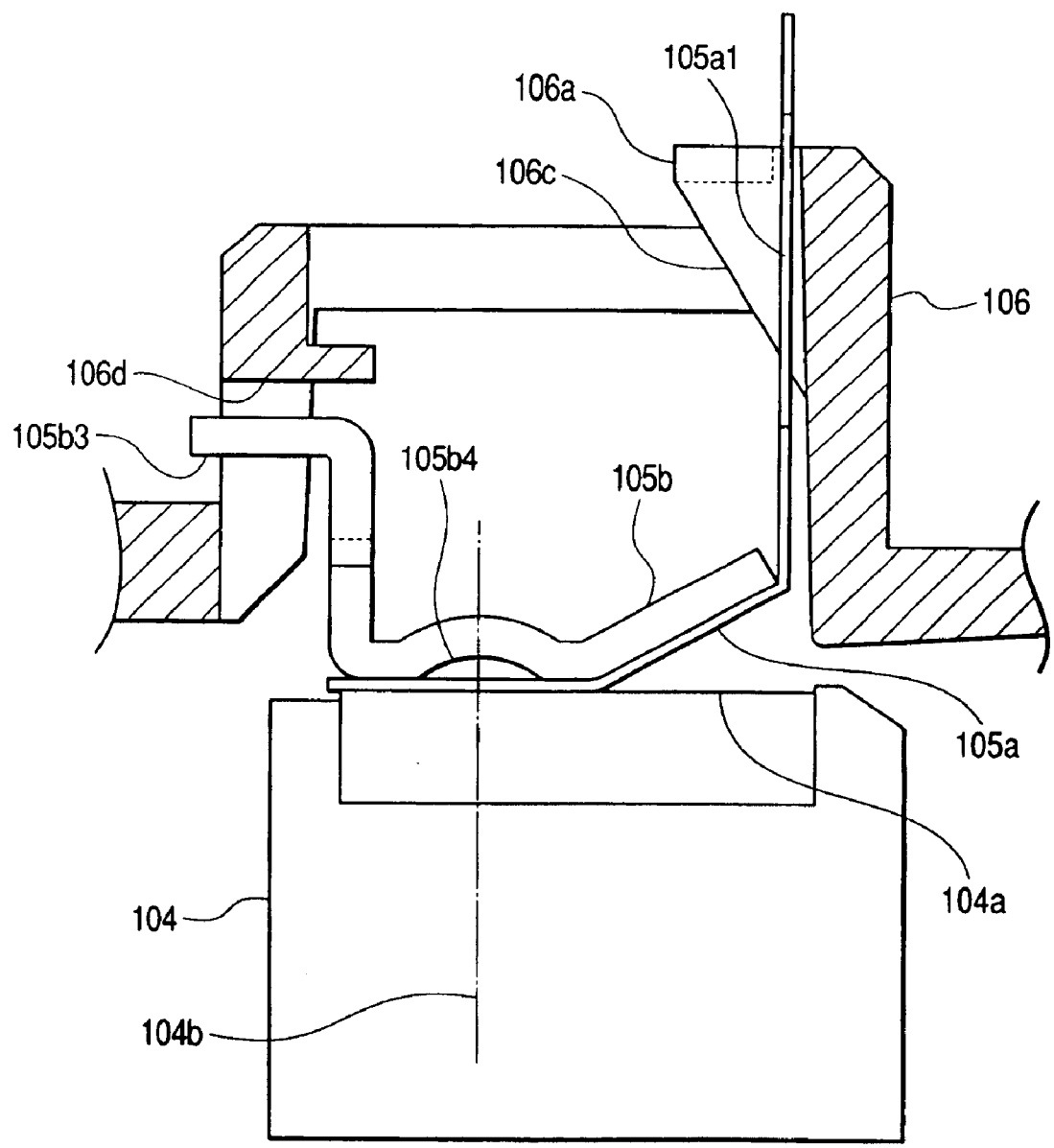
FIG. 10 is a enlarged view of the original pressing means of the fourth embodiment of the present invention.

Next, the above described original pressing means 105 will be described in detail. FIG. 9 is a perspective view showing the state of fixing the original pressing means and the upper original guide, and FIG. 10 is a main cross-sectional enlarged view of the original pressing member and its surrounding region as seen from the arrow mark B in FIG. 9. In FIG. 9 and FIG. 10, FIG. 11, 105 is the original pressing means and it is for pressing the original S to the contact image sensor 104. This original pressing means 105 is configured by a white sheet 105a which is a color reference member and the original pressing member 105b for pressing the original S on the reading surface of the contact image sensor 104 via the white sheet 105a.

As shown in FIG. 10, the above described white sheet 105a and the original pressing member 105b are connected by a double tape. Note that the method for connecting the above described sheet 105a and the original pressing member 105b is not limited to this, but both of them may be connected by adhesive other than the double-tape (such as acrylic, rubber-based adhesives) or bonding material.

Also, as shown in FIG. 9, the white sheet 105a has a mounting hole 105a1 which becomes a mounting portion to the upper original guide 106 on its longitudinal both ends (both ends in the width direction orthogonal to the original conveying direction) in the original conveying direction upstream side. This white sheet 105a is deformable and definitely for example, formed by material such as polyester film, synthetic paper (the so-called YUPO), polycarbonate sheet, vinyl chloride sheet and the like.

And, on the upper original guide 106, a triangle rib 106a as a hanging portion for hangingly support a mounting hole 105a1 of the above described white sheet 105a is disposed.

Moreover, on the triangle rib 106a, a slip-out stopping portion 106b for stopping the slip-out of the mounting hole 105a1 of the white sheet 105a and a slope 106c for guiding the mounting hole 105a1 of the white sheet 105a when the original pressing means 105 is mounted on the upper original guide 106. Here, clearances t1 to t4 are the clearances disposed so that the original pressing means can move to predetermined locations.

Moreover, the original pressing member 105b has a projecting portion 105b3 which becomes the mounting portion to the upper original guide 106 in the original conveying direction downstream side at longitudinal both ends. And, on the upper original guide 106, a mounting hole 106d for hangingly support the projecting portion 105b3 of the above described pressing member 105b is disposed. Here, t1' to t4' are clearances in which the original pressing member can move to predetermined locations.

Consequently, the mounting of the original pressing means 105 combined as above to the upper original guide 106 can be easily executed by inserting the projecting portion 105b3 of the original pressing member 105b into the mounting hole 106d of the upper original guide 106, and by pushing the mounting hole 105a of the white sheet 105a along the slope 106c of the triangle rib 106a, and then by inserting the mounting hole 105a of the white sheet 105a into the triangle rib 106a.

In FIG. 10, the method for preventing the adhesion (or cohesion) of the white sheet to the reading portion in the present invention is shown. The original pressing member 105b opposing to the reading location 104b (an alternate long and short dash line) of the contact image sensor in the image reading portion 102 is configured such that a concave portion 105b4 recessed in the shape of a concave is disposed which is pressed down by dead load alone of the original pressing member 105b. By so doing, the dead load of the original pressing member 105b is not applied to the reading location 104a. Consequently, since the white sheet 105a is not given a pressure at the reading location 104b, the deterioration of brightness at the time of the pre-scanning owing to the adhesion to the reading surface 104a is prevented so that a constant output can be always obtained. This time, the original pressing member 105b uses a sheet steel and a clearance between the concave portion 105b4 and the reading surface 104a is set at 0.7 mm by a longitudinal bead drawing. Needless to mention, for the original pressing member 105b, integral molding components using resin members may be used.

Figure 13:
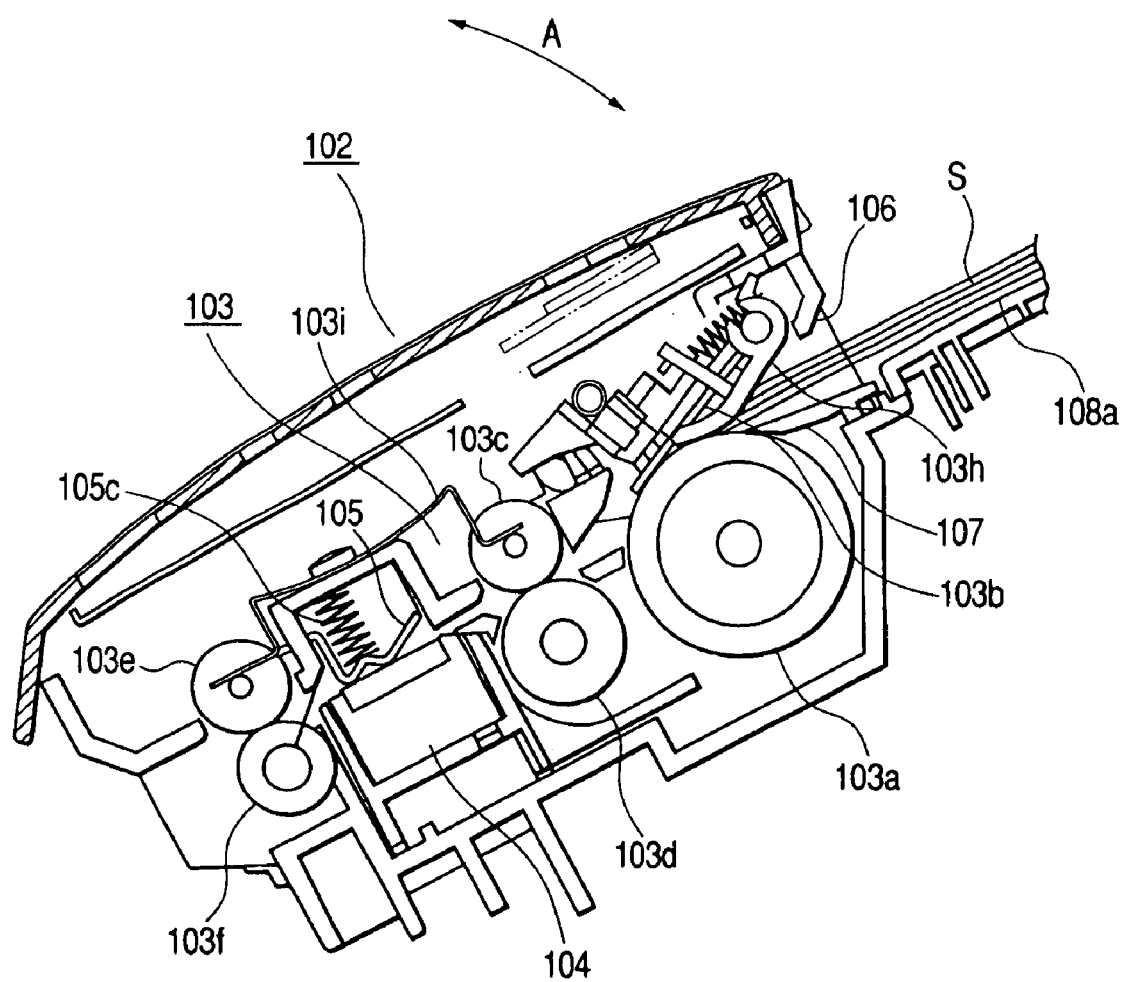
FIG. 13 is a normal cross sectional view of the image reading apparatus comprising the original pressing means relative to a fifth embodiment of the present invention.

Also, as the fifth embodiment, as shown in FIG. 13, the embodiment is configured in such manner that, by pressing the original pressing member 105b to the reading surface 104a by using the original pressing compression spring 105c, the original can be adhered to the reading surface 104a more reliably than by dead load of the original pressing member 105b. At this time also, the white sheet 105a does not stick to the reading surface 104a in the reading location 104b and, therefore, the deterioration of brightness at the time of the pre-scanning is prevented so that a constant output can be always obtained. This time, the spring is used longitudinally at three places. Needless to mention, however, the present invention does not depend upon the number of springs used.

Figure 14:
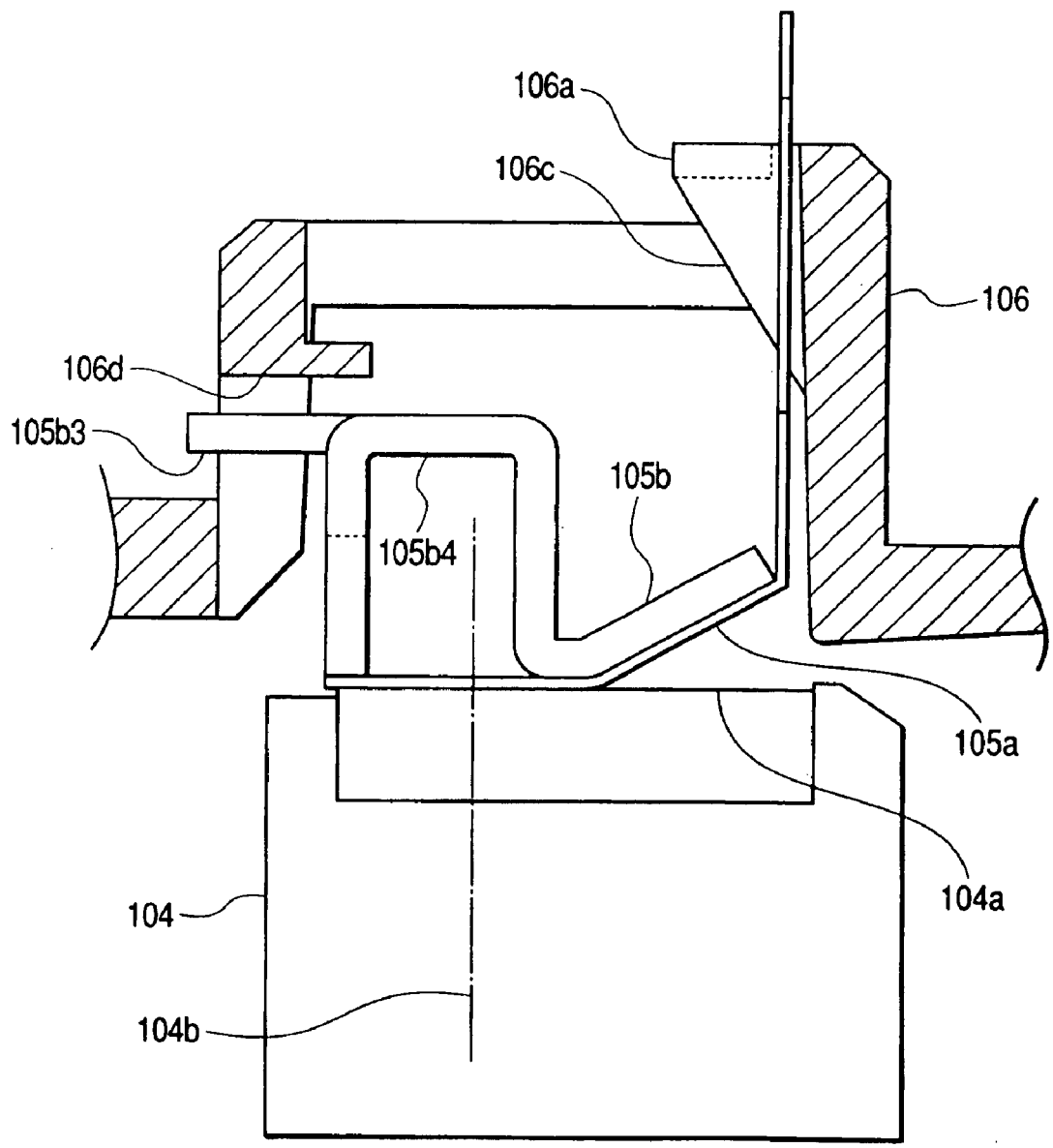
FIG. 14 is an enlarged view of the original pressing means relative to a sixth embodiment of the present invention.

Moreover, as the sixth embodiment, as shown in FIG. 14, the embodiment may be configured in such manner that the original pressing member 105b using the sheet steel is completely recessed from the reading location 104b by being bent in a rectangular shape around the peripheral region of the reading location 104b.

In the above described embodiment, one sample of the original pressing means is shown. Needless to mention, however, the present invention is not limited to this, but can be applied to the original pressing means using metal.

What is claimed is:

1. An image reading apparatus comprising:
conveying means for conveying an original;
reading means for optically reading the information recorded in the conveyed original at a reading location; and
an original pressing member having a surface opposed to said reading means for pressing the original to said reading means, wherein said original pressing member includes a color reference member used as a color reference at the time when said information is read by said reading means, and wherein said original pressing member is inclined and disposed such that an upstream end portion or a downstream end portion of said opposed surface is in contact with said reading means respectively at an upstream side or a downstream side of said reading location, and the opposite end portion of said opposed surface is separated from said reading means by a predetermined distance.

2. The image reading apparatus according to claim 1 further comprising a contacting portion and a regulating portion, wherein said original pressing member is positioned by disposing said contacting portion at a downstream side of said original pressing member and in contact with the regulating portion.

3. The image reading apparatus according to claim 2, wherein said regulating portion is a portion configured in a planar form, and said regulating portion is configured by the surface of the original conveying direction downstream side of a bent portion bent in the opposite direction against said reading means in the original conveying direction downstream side of said original pressing member.

4. The image reading apparatus according to claim 3, wherein the reading surface of said reading means is disposed inclined with the original conveying direction upstream side, and the image reading apparatus is configured in such manner that said regulating portion contacts said contacting portion by the dead load of said original pressing member.

5. The image reading apparatus according to claim 4, wherein said bent portion is bent approximately vertically, and said regulating portion is set so as to make an acute angle with the reading surface of said reading means.

6. The image reading apparatus according to claim 1, further comprising compressing means for compressing said original pressing member to said reading means.

7. An image reading apparatus comprising:

conveying means for conveying an original;

reading means for optically reading the information recorded in the conveyed original at a reading location;

an original pressing member for pressing the original to said reading means; and a color reference member used as a color reference at the time when said information is read by said reading means, wherein said color reference member is arranged between said reading means and said original pressing member, and wherein a pressing location of said original pressing member is disposed only at a downstream side and at an upstream side of said reading location.

8. The original reading apparatus according to claim 7, wherein the shape of said original pressing member in said reading location is in the shape recessed from said pressing location.

9. The image reading apparatus according to claim 8, further comprising compressing means for compressing said original pressing member to said reading means.

10. The image reading apparatus according to claim 2, wherein the reading surface of said reading means is disposed inclined with the original conveying direction upstream side, and the image reading apparatus is configured in such manner that said regulating portion contacts said contacting portion by the dead load of said original pressing member.

11. The image reading apparatus according to claim 10, wherein said original pressing member is movably engaged with the image reading apparatus via said color reference member disposed in said opposed surface.

12. An image reading apparatus according to any one of claims 1, 2, 6, 7–9, 10, and 11, and further comprising;

sheet conveying means for conveying sheets; and image forming means for forming an image on the conveyed sheets.

13. An image reading apparatus comprising:

a feeding roller;

an image sensor, which optically reads information recorded in an original fed by said feeding roller at a reading location;

an original pressing member having a surface opposed to said image sensor; and a color reference member arranged between said image sensor and said original pressing member, wherein said original pressing member is inclined and an upstream end portion or a downstream end portion of said opposed surface is pressed against said image sensor through said color reference member respectively at an upstream side or a downstream side of said reading location, and the opposite end portion of said opposed surface is separated from said image sensor by a predetermined distance.

14. An image reading apparatus, comprising:

a feeding roller at a reading location;

an image sensor, which optically reads information recorded in an original fed by said feeding roller at a reading location;

an original pressing member; and a color reference member arranged between said image sensor and said original pressing member, wherein a pressing location of said original pressing member is disposed at a downstream side or at an upstream side of said reading location.

* * * * *

UNITED STATES PATENT AND TRADEMARK OFFICE
CERTIFICATE OF CORRECTION

| | |
|---|---|
| PATENT NO. | : 7,079,294 B1 |
| APPLICATION NO. | : 09/695931 |
| DATED | : July 18, 2006 |
| INVENTOR(S) | : Daigo Nakagawa et al. |

It is certified that error appears in the above-identified patent and that said Letters Patent is hereby corrected as shown below:

ON THE TITLE PAGE [57] ABSTRACT:
    Line 6, "a" (third occurrence) should read --at--.

COLUMN 1:
    Line 10, "an" should read --a--; and
    Line 21, "vis." should read --vise.--.

COLUMN 2:
    Line 41, "Invention;" should read --invention;--.

COLUMN 3:
    Line 4, "EMBODIMENT" should read --EMBODIMENTS--; and
    Line 40, "An" should read --A--.

COLUMN 4:
    Line 28, "regal" should read --legal--; and
    Line 39, "a" should read --an--.

COLUMN 5:
    Line 15, "an" should read --a--;
    Line 28, "a" should read --an--;
    Line 29, "type" should read --type of--;
    Line 30, "a" should be deleted and
        "view of show" should read --views of an--; and
    Line 52, "line-feeded" should read --line-fed--.

COLUMN 6:
    Line 34, "while should read --white--; and

COLUMN 7:
    Line 1, "and" should read --and is--; and
    Line 49, "configuration" should read --configurations--.

UNITED STATES PATENT AND TRADEMARK OFFICE
CERTIFICATE OF CORRECTION

PATENT NO. : 7,079,294 B1
APPLICATION NO. : 09/695931
DATED : July 18, 2006
INVENTOR(S) : Daigo Nakagawa et al.

It is certified that error appears in the above-identified patent and that said Letters Patent is hereby corrected as shown below:

COLUMN 8:
    Line 14, "an" should read --a--; and
    Line 66, "linefeeded" should read --line-fed--.

COLUMN 9:
    Line 47, "support" should read --supporting--; and
    Line 61, "support" should read --supporting--.

COLUMN 12:
    Line 14, "claims 1, 2, 6, 7-9, 10, and 11," should read --claims 1-11,--.

Signed and Sealed this

Twenty-ninth Day of January, 2008

JON W. DUDAS
*Director of the United States Patent and Trademark Office*